US010546030B2

(12) United States Patent
Hawking et al.

(10) Patent No.: US 10,546,030 B2
(45) Date of Patent: Jan. 28, 2020

(54) LOW LATENCY PRE-WEB CLASSIFICATION

(71) Applicant: Microsoft Technology Licensing, LLC, Redmond, WA (US)

(72) Inventors: David Anthony Hawking, Canberra (AU); Peter Richard Bailey, Canberra (AU); Bodo von Billerbeck, Melbourne (AU); Nicholas Eric Craswell, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1033 days.

(21) Appl. No.: 15/012,684

(22) Filed: Feb. 1, 2016

(65) Prior Publication Data

US 2017/0220687 A1    Aug. 3, 2017

(51) Int. Cl.
G06F 16/24     (2019.01)
G06F 16/9535   (2019.01)
G06F 16/248    (2019.01)
G06F 16/2457   (2019.01)

(52) U.S. Cl.
CPC ........ *G06F 16/9535* (2019.01); *G06F 16/248* (2019.01); *G06F 16/24578* (2019.01)

(58) Field of Classification Search
CPC ......... G06F 16/901–902; G06F 16/951; G06F 16/248; G06F 16/24578; G06F 16/9535
See application file for complete search history.

(56) References Cited

U.S. PATENT DOCUMENTS

| 7,849,063 | B2  | 12/2010 | Stata et al. |
| 8,478,704 | B2* | 7/2013  | Risvik ............... G06F 16/24578 706/45 |
| 8,498,977 | B2  | 7/2013  | Gross et al. |
| 8,566,340 | B2  | 10/2013 | Udupa et al. |
| 8,713,024 | B2* | 4/2014  | Risvik ................. G06F 16/951 707/741 |

(Continued)

OTHER PUBLICATIONS

Zhong, et al., "A Design of the Inverted Index Based on Web Document Comprehending", In Journal of Computers, vol. 6, No. 4, Apr. 2011, 7 pages.
"Cleo: Flexible, partial, out-of-order and real-time typeahead search", Published on: Dec. 24, 2011 Available at: hittp://tm.durusau.net/?p=19651, 2 pgs.

(Continued)

*Primary Examiner* — Robert W Beausoliel, Jr.
*Assistant Examiner* — Nirav K Khakhar

(57) ABSTRACT

Non-limiting examples of the present disclosure describe low latency pre-web classification of query data. In examples, processing is performed where query data may be analyzed in a low latency manner that includes providing a vertical intent classification and entity identification for query data before a web ranking service processes the query data. Query data may be received. A vertical intent classification index may be searched using the query data. In examples, the vertical intent classification index may comprise a set of files that can be used to determine one or more candidate entity identifiers for the query data. The one or more entity identifiers may be ranked. The query data, a vertical intent classification for the vertical intent classification index and the one or more ranked candidate entity identifiers may be transmitted for processing associated with a web ranking service. Other examples are also described.

20 Claims, 7 Drawing Sheets

(56) References Cited

U.S. PATENT DOCUMENTS

| | | | |
|---|---|---|---|
| 9,008,447 B2 | 4/2015 | King et al. | |
| 9,424,351 B2* | 8/2016 | Risvik | G06F 16/951 |
| 2005/0055372 A1* | 3/2005 | Springer, Jr. | G06F 16/313 |
| 2010/0121838 A1* | 5/2010 | Tankovich | G06F 16/951 |
| | | | 707/715 |
| 2011/0055192 A1 | 3/2011 | Tang et al. | |
| 2013/0332438 A1* | 12/2013 | Li | G06F 16/9535 |
| | | | 707/706 |
| 2014/0074845 A1 | 3/2014 | Dimassimo et al. | |
| 2015/0206070 A1 | 7/2015 | Kulkarni et al. | |
| 2015/0363476 A1* | 12/2015 | Li | G06F 16/258 |
| | | | 707/714 |
| 2016/0012052 A1* | 1/2016 | Zoryn | G06F 16/951 |
| | | | 707/728 |
| 2016/0189026 A1* | 6/2016 | Marin | G06F 16/951 |
| | | | 706/31 |
| 2016/0189047 A1* | 6/2016 | Meij | G06N 7/005 |
| | | | 706/11 |

OTHER PUBLICATIONS

Gao, et al., "Semantic Search Based on SVO Constructions in Chinese", In Proceedings of International Conference on Web Information Systems and Mining, Nov. 7, 2000, pp. 213-216.

Hu, et al., "Speeding Up QA: An Index Structure for Question Queries", In Proceedings of Canadian Conference on Electrical and Computer Engineering, Apr. 22, 2007, 4 pages.

Turel, Anil, "A New Approach to Search Result Clustering and Labeling", In Master's Thesis, Aug. 2011, 81 pages.

Risvik, et al., "Maguro, a system for indexing and searching over very large text collections", In Proceedings of the sixth ACM international conference on Web search and data mining, Feb. 4, 2013, 10 pages.

Brin, et al., "The Anatomy of a Large-Scale Hypertextual Web Search Engine", In Journal of Computer Networks and ISDN Systems, vol. 30, Issue 1-7, Apr. 1, 1998, 18 pages.

"MSIT—109 Information Organization and Retrieval", Retrieved on: Nov. 24, 2015 Available at: http://164.100.133.129:81/eCONTENT/Uploads/MSIT-109-IR.pdf, 317 pgs.

* cited by examiner

400

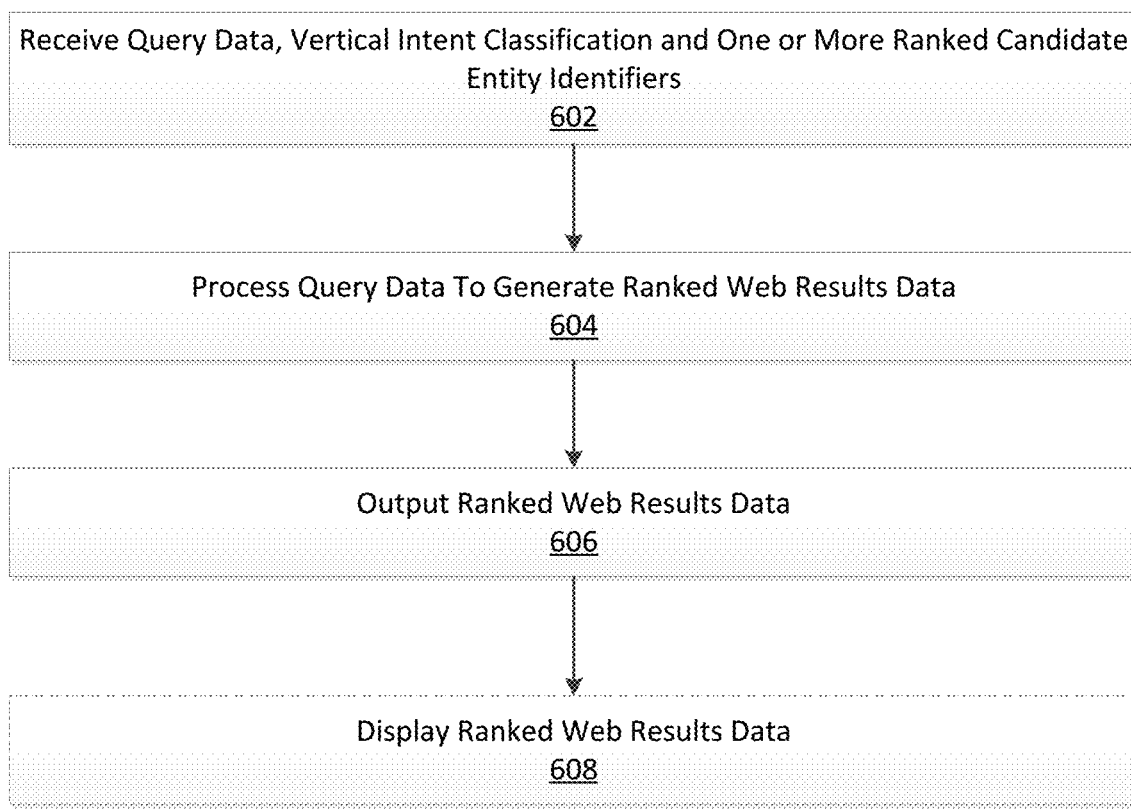

LOW LATENCY PRE-WEB CLASSIFICATION

BACKGROUND

A global web search engine receives a very high volume of queries. Queries arrive at rates of up to around 10,000 per second and each query must be processed within a few hundred milliseconds. Before retrieving results, a search engine may perform a pre-web result ranking in order to bias results towards a particular topic or entity of interest. However, this kind of ranking method is a lengthy process that can result in high latency or delay in returning results to a user. With respect to latency considerations in query data processing, a large part of the allowable latency is taken up in searching the main web indexes to return results to query data. It is with respect to the general technical environment of improved processing for devices that perform pre-web classification of queries that the present application is directed.

SUMMARY

Non-limiting examples of the present disclosure describe low latency pre-web classification of query data. In examples, processing is performed where query data may be analyzed in a low latency manner that includes providing a vertical intent classification and entity identification for query data before a web ranking service processes the query data. Query data may be received. A vertical intent classification index may be searched using the query data. In examples, the vertical intent classification index may comprise a set of files that can be used to determine one or more candidate entity identifiers for the query data. The one or more entity identifiers may be ranked. The query data, a vertical intent classification for the vertical intent classification index and the one or more ranked candidate entity identifiers may be transmitted for processing associated with a web ranking service.

In other non-limiting examples a system may comprise one or more components for pre-web processing of query data and/or one or more components for a web ranking service that executes operations for processing query data to return results data over a network. As an example, the system may comprise at least a pre-web classification component and a web ranking component. The pre-web classification component that may be configured to receive and process query data. The pre-web classification component uses the query data to search a vertical intent classification index of short text documents. The vertical intent classification index comprises a set of files to determine one or more candidate entity identifiers for the query data. Searching of the vertical intent classification index may determine one or more candidate entity identifiers for the query data. The one or more candidate entity identifiers may be ranked. The pre-web classification component may transmit the query data, a vertical intent classification for the vertical intent classification index and the one or more ranked candidate entity identifiers to a web ranking component. The system may further comprise a web ranking component. The web ranking component may be configured to process the query data (and additional data transmitted from the pre-web classification component) to return web results data. As an example web ranking component receives the query data, the vertical intent classification and the one or more ranked candidate entity identifiers, for example, from the pre-web classification component. The web ranking component may further rank and output ranked web results data based processing of the query data, the vertical intent classification and the one or more ranked candidate entity identifiers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 6 is an exemplary method for processing of query data by a web ranking service with which aspects of the present disclosure may be practiced.

DETAILED DESCRIPTION

Figure 1:
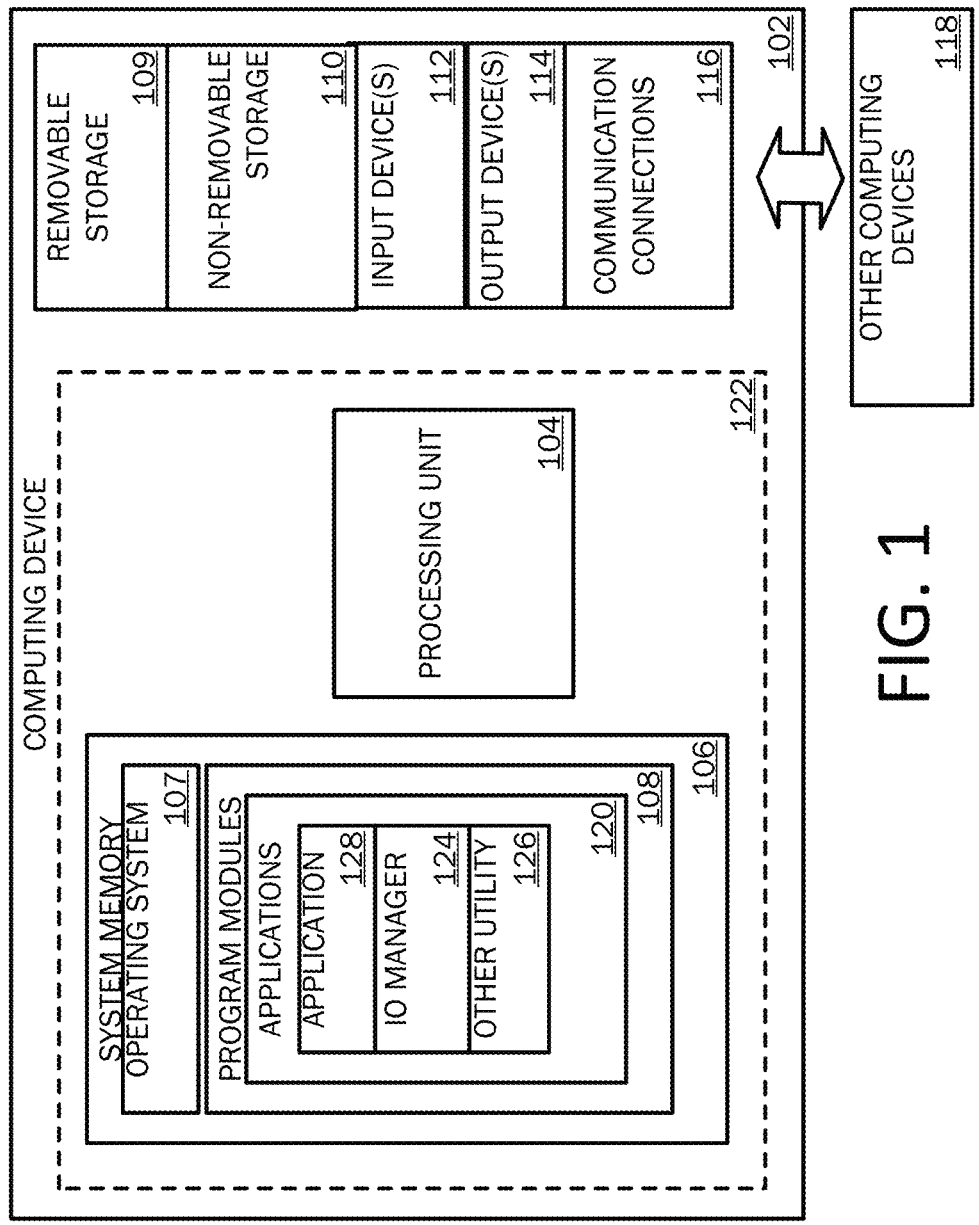
FIG. 1 is a block diagram illustrating an example of a computing device with which aspects of the present disclosure may be practiced.

Examples described herein provide a low-latency pre-web query classification for query data through inverted index-facilitated matching. A search engine service may employ a web ranking service to process query data, acquire search results, rank the search results, and return the ranked search results. Queries are submitted to a search engine service on the order of 10s or even 100s of thousands per second. For each of these queries, the web ranking service decides whether specific documents or entities should be shown for the query at hand. A web ranking service may be used to rank web results data, for example, determining results that may be prominently placed at the top of the search results page (SERP). However, for smaller text documents such as song titles or obscure academic papers, a web ranking service may have a difficult time returning accurate web results, where indexes used may not typically be geared toward smaller text documents. In other cases, results returned by the web ranking service may be less diversified or rich as compared with what a web ranking service may have been able to provide if it entity information was received prior to determining search results and ranking the search results. For example, if a user searches for a song lyric, processing may return web results that provide simply links to the song lyrics. However, a web ranking service may be able to provide richer results in addition to a link to the lyrics such as an audio file for the song, artist information, a musical score associated with the song, etc., in a case where entity data is known early in query processing. Being able to identify results data and entity data early in query processing may enable more efficient processing for a web ranking service to return results data as well as reduce the latency in processing query data while returning richer results. As search engines process such a large amount of data, developers are cognizant of incorporating any processing that may result in additional latency with respect to the returning of search results. Before retrieving results, pre-web candidate entity evaluation (before ranking performed by a web ranking service) may be performed in order to bias results towards a particular topic or entity of interest. However, this kind of ranking method is a lengthy process that can result in high latency or delay in returning results to a user. Delay in returning results to users may create a negative user experience.

In examples described herein, processing is performed where query data can be analyzed in a low latency manner that includes providing a vertical intent classification and entity identification for query data before a web ranking service processes the query data. The present disclosure is considered low latency as compared with known indexing methods as the processing of the query data during pre-web classification results in a minimal delay in processing time as compared with alternative solutions described herein. Query data is any data associated with a request for processing. As one example, query data may relate to a search query. A generated vertical intent classification index may be used to process the query data and transmit data to a web ranking service or processing device(s) associated with a web ranking service to display web ranking results. The vertical intent classification index comprises a set of files (described in more detail below) to quickly and efficiently determine one or more candidate entity identifiers for the query data and transmit data to a web ranking service to improve query data processing. The vertical intent classification index is unique because it is an index tailored to short text documents (e.g., documents contain less than a certain number of words). In one example, short text documents may be document that contains 250 words or less. However, in other examples, the length of documents that are considered short text documents may vary. For example, the vertical intent classification index may comprise reference to words or portions of words from documents including but not limited to: songs, titles (e.g., document tiles, movie titles, song titles, book titles, etc.) and academic papers, among other examples. The vertical intent classification may be searched using short text (e.g., words or portions of words in the query data to improve searching and document matching. Data transmitted to the web ranking service based on processing using the vertical intent classification index may include but is not limited to: query data, vertical intent classification, one or more candidate entity identifiers (e.g., identification of an entity, documents or files associated with the entity, any other data associated with an entity that can be useful for a web ranking service), and scoring or ranking for the candidate entity identifiers, among data transmitted.

Vertical classification of queries may be used to classify query data by vertical intent. A vertical intent is a classification in which content may be categorized to improve processing of query data. Content may be classified in one or more vertical intents. Examples of vertical intents may comprise but are not limited to: shopping information, advertising information, legal information, medical information, scholarly literature and academic papers, song lyrics, movie titles, book titles, travel information, news information, sports information, etc. Vertical intent classification focuses on classifying content of query data into one or more specific segments or vertical intents. Vertical classification may be performed by one or more processing devices or services associated with search engine processing. However, one skilled in the art should recognize that examples described herein are not limited to devices and/or services associated with search engine processing.

Vertical classification of queries is challenging because intent words are often missing. In one example, it may only be known that a query such as "Lucy in the sky with diamonds" is associated with a song because the query data matches the words in a song. Examples described herein enable lookup and classification of query data which is fast enough to make a pre-web query classification and that is tolerant to errors in queries such as missing words, added words, and changed word order. e.g. "Suzie in the sky with diamonds." Pre-web query classification is processing that occurs before query data is passed to a web ranking service to retrieve web results data. In examples described herein, query data may be classified by vertical intent based on processing that leverages knowledge data to evaluate content associated with a query. Knowledge data is a collection of data that is used to enhance processing in examples described herein. Knowledge data may comprise semantic-search information gathered from wide variety of sources. In one example, knowledge data may comprise a knowledge graph providing structured and detailed information about entity data and associations between entities. Knowledge data may be used in any aspect of processing of query data that is applicable including pre-web query processing, web query processing and post-web query processing. As such, knowledge data may be integrated within and/or interface with one or more components such as the components of system 400 described in FIG. 4. In an example, knowledge data processing may be used to generate file data that is used in exemplary pre-web query processing to classify candidate vertical intents associated with query data. In other examples, knowledge data may be applied to evaluate received file data that may be used in pre-web processing that includes determining and ranking candidate entity identifiers for query data. In at least one example, processing is performed to evaluate query data evaluates candidate entity identifiers and vertical intents associated with the candidate entity identifiers, among other features. Processing may be further performed to rank the candidate entity identifiers (e.g., identification of entity data that can be used by a web ranking service to retrieve and rank web results data) and pass the query data along with one or more ranked candidate entity identifiers (and vertical intent classification) to one or more processing devices/services that may perform web result ranking.

Examples described herein provide advantages over types of processing performed in associated with entity identification processing. Some other solutions may perform vertical intent classification post-web, where results from a search of web indexes are used to perform vertical classification. This may result in a vertical classification being performed too late for some purposes and also result in higher latency. The present disclosure also provides an advantage over hash table matching, as hash table processing is less useful than examples of the present disclosure because hash table processing requires as exact matching for query data. Other solutions may execute whitelist processing, where matching is performed against a limited list of candidates. However, such processing may be too slow when the list of candidates is large and the matching performed during whitelist processing may be very inflexible when compared with examples of the present application. Examples of the present application also provide benefit over processing of a tree data structure (e.g., trie) to perform vertical classification. A trie allows for low latency matching. However, processing of a trie is quite inflexible, where trie matching typically needs to have the same prefix as the query (a large portion of the query and the potential targeted document must begin with the same characters/words). To increase flexibility in such an example, significant increase in memory and processing capability would be required. Other solutions such as machine learned classifiers may be employed. However, achieving good coverage and a precision for vertical intent classification from a machine learned classifier is difficult due to the shortness of queries, the size of the vocabularies and the importance of word sequences. For example, the presence of the word "Na" is not by itself a good feature for classifying a query as a song lyric, whereas "Na na na, na na na" may be a stronger indicator of being associated with a song lyric. Other solutions may perform complex and sophisticated indexing of candidates (e.g., technology used in searching a web index.) Sophistication and complexity adds to both the time taken to process a query and to the space required for indexes, which tends to further increase response time resulting in higher latency than examples described herein.

Considerable advantage accrues if incoming queries can be classified into vertical intents before processing by a web ranking service commences. With this knowledge, the query processing can be biased in various ways, and appropriate vertical-specific answer generation can be triggered. Accordingly, the present disclosure provides a plurality of technical advantages including but not limited to: generation of reduced latency in processing query data, ability to classify vertical intents before search of web indexes commences, extensibility with a plurality of processing devices and services including ability to pass vertical intent classification for a query to a plurality of services including web searching services, improved user interaction when executing search retrieval on processing device, more efficient operation of a processing device executing query processing (e.g., saving computing cycles/computing resources), ability to work with short text queries including partial words, and the ability to use either full AND conjunctions of terms or a more relaxed filtering set, based on the query at hand, and/or the individual target segments, among other examples.

Figure 2A:
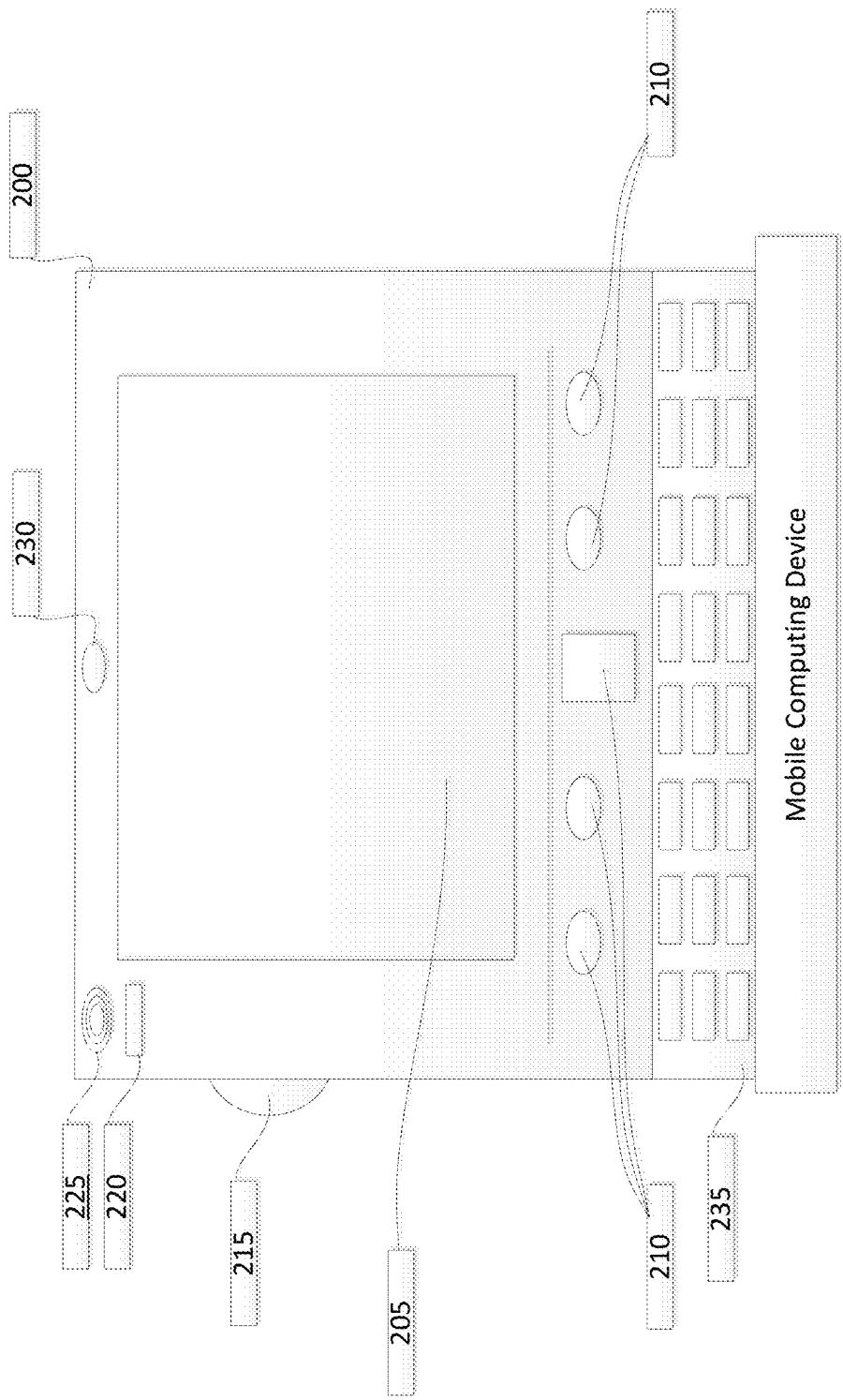
FIGS. 2A and 2B are simplified block diagrams of a mobile computing device with which aspects of the present disclosure may be practiced.
Figure 2B:
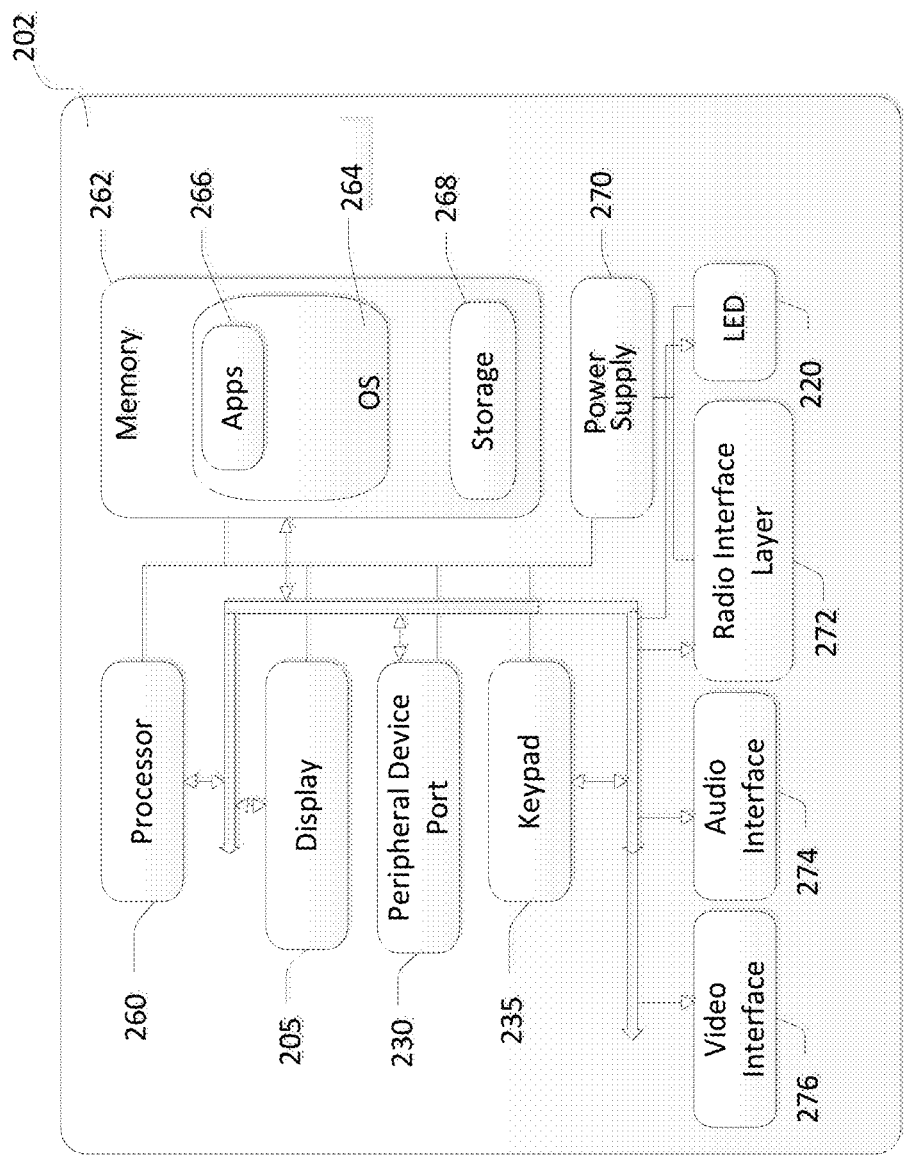
Figure 3:
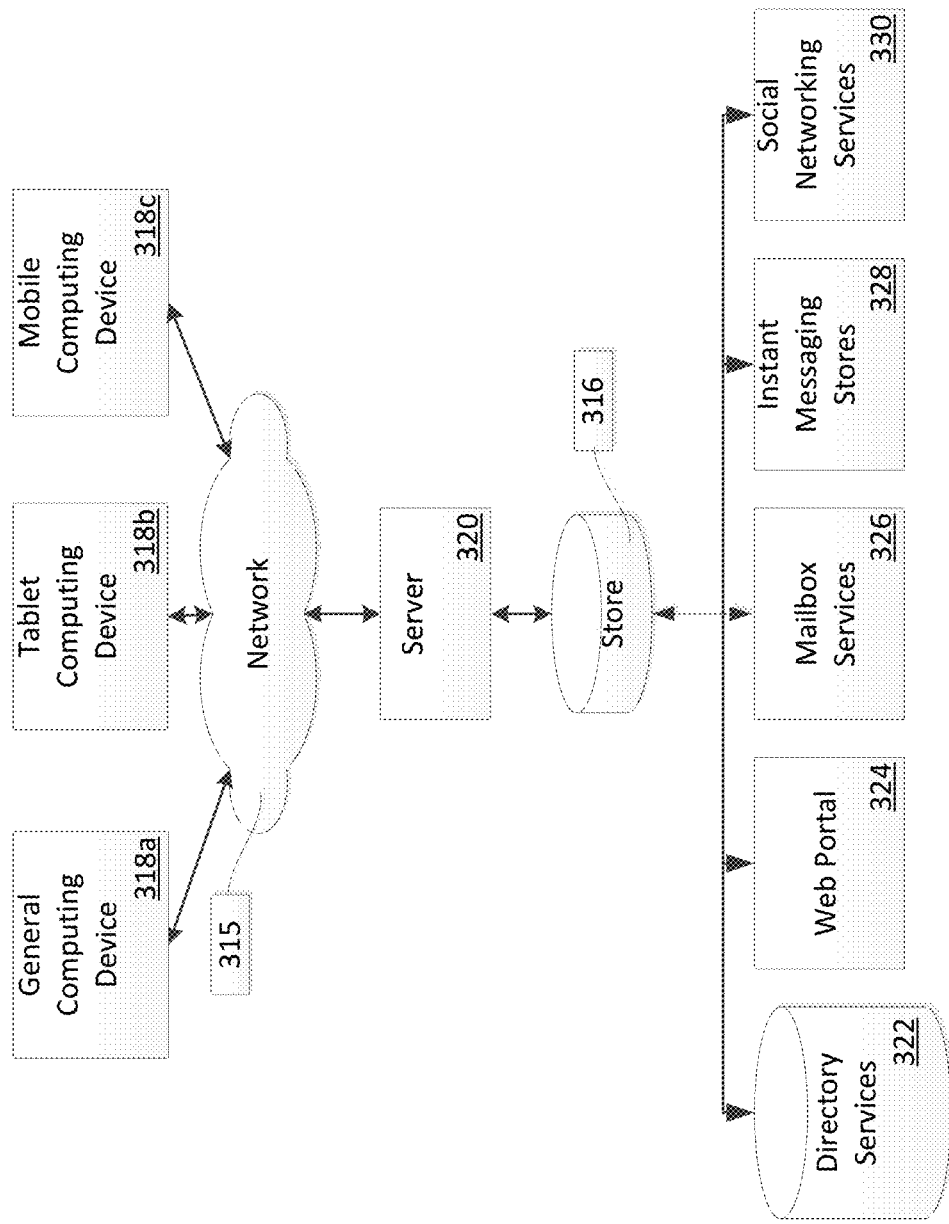
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. For example, computing device 102 may be an exemplary computing device for implementation of processing performed for pre-web classification and/or processing by a web ranking service as described herein. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 502 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 104 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. Mobile computing device 200 may be an exemplary computing device for processing performed for pre-web classification and/or processing by a web ranking service as described herein. For example, mobile computing device 200 may be implemented to execute applications and/or application command control. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., a touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device 200 described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices. Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225. In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225, the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for providing an application that reliably accesses target data on a storage system and handles communication failures to one or more client devices, as described above. The system of FIG. 3 may be an exemplary system for processing performed for pre-web classification and/or processing by a web ranking service as described herein. Target data accessed, interacted with, or edited in association with programming modules 108, applications 120, and storage/memory may be stored in different communication channels or other storage types. For example, various documents may be stored using a directory service 322, a web portal 324, a mailbox service 326, an instant messaging store 328, or a social networking site 330, application 128, IO manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and client nodes may be implemented as a computing device 102 embodied in a personal computer, a tablet computing device, and/or by a mobile computing device 200 (e.g., mobile processing device). Any of these examples of the client computing device 102 or 200 may obtain content from the store 316.

Figure 4:
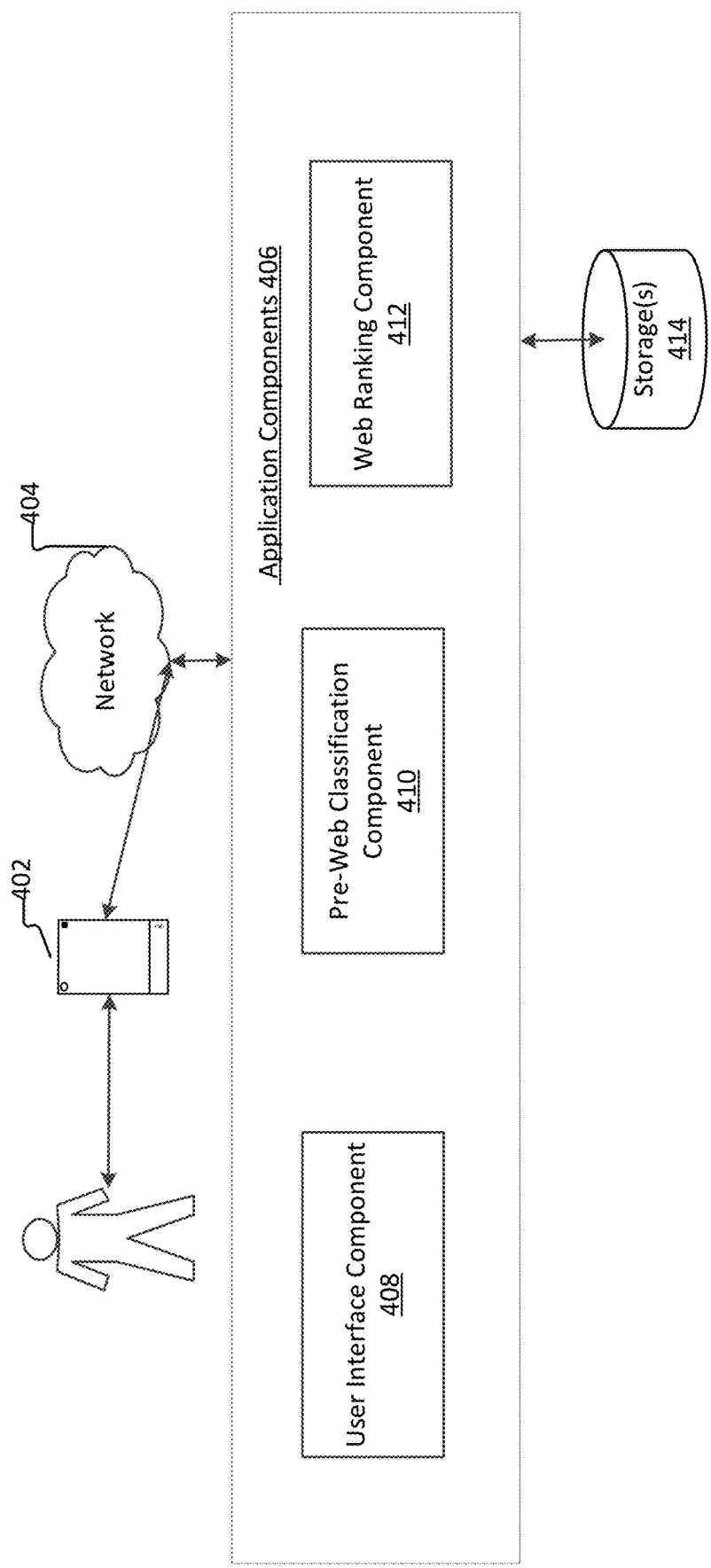
FIG. 4 illustrates an exemplary system implementable on one or more computing devices on which aspects of the present disclosure may be practiced.

FIG. 4 illustrates an exemplary system 400 implementable on one or more computing devices on which aspects of the present disclosure may be practiced. System 400 may be an exemplary system for processing performed for pre-web classification and/or processing by a web ranking service as described herein. Exemplary system 400 presented is a combination of interdependent components that interact to form an integrated whole for learned program generation based on user example operations. Components of system 400 may be hardware components or software implemented on and/or executed by hardware components. In examples, system 400 may include any of hardware components (e.g., ASIC, other devices used to execute/run an OS, and software components (e.g., applications, application programming interfaces, modules, virtual machines, runtime libraries) running on hardware. In one example, an exemplary system 400 may provide an environment for software components to run, obey constraints set for operating, and makes use of resources or facilities of the systems/processing devices, where components may be software (e.g., application, program, module) running on one or more processing devices. For instance, software (e.g., applications, operational instructions, modules) may be run on a processing device such as a computer, mobile device (e.g., smartphone/phone, tablet) and/or any other electronic devices. As an example of a processing device operating environment, refer to operating environments of FIGS. 1-3. In other examples, the components of systems disclosed herein may be spread across multiple devices. For instance, input may be entered on a client device (e.g., processing device) and information may be processed or accessed from other devices in a network such as one or more server devices.

One of skill in the art will appreciate that the scale of systems such as system 400 may vary and may include more or fewer components than those described in FIG. 4. In some examples, interfacing between components of the system 400 may occur remotely, for example where components of system 400 may be spread across one or more devices of a distributed network. In examples, one or more data stores/storages or other memory are associated with system 400. For example, a component of system 400 may have one or more data storages/memories/stores associated therewith. Data associated with a component of system 400 may be stored thereon as well as processing operations/instructions executed by a component of system 400. Components of the system 400 may interface with an OS of a processing device perform processing operations related to launching and execution of a web browser application that comprises an exemplary web browser extension. One or more components of system 400 may be used in providing an exemplary processing for pre-web classification as well as processing by a web ranking component(s), among other examples. Furthermore, it is presented that Application services components of system 400 may interface with other application services. Application services may be any resource that may extend functionality of one or more components of system 400. Application services may include but are not limited to: web search services, e-mail applications, calendars, device management services, address book services, informational services, etc.), line-of-business (LOB) management services, customer relationship management (CRM) services, debugging services, accounting services, payroll services, and services and/or websites that are hosted or controlled by third parties, among other examples. Application services may further include other websites and/or applications hosted by third parties such as social media websites; photo sharing websites; video and music streaming websites; search engine websites; sports, news or entertainment websites, and the like. Application services may further provide analytics, data compilation and/or storage service, etc., in association with components of system 400.

Further, components of system 400 may possess processing means and may be configured to handle any type of input including but not limited to speech/voice input, text input, gesture input, handwritten input, among other examples. As an example, query data may be received through any of the above identified means. System 400 may be scalable and configurable to operate on a variety of processing devices including but not limited to: desktop computers, laptop computers, mobile processing devices such as phones, tablets, slates, wearable processing devices (e.g., watches, glasses, earpieces), vehicular processing devices, and any other devices having at least one processor, among other examples. Exemplary system 400 comprises application components 406 including a user interface component 408, a pre-web classification component 410, and a web ranking component 412, where each of the identified components may comprise one or more additional components.

System 400 may further comprise one or more storages 414 that may store data associated with operation of one or more components of system 400. Storages 414 are any physical or virtual memory space. Storages 414 may store any data for processing operations performed by components of system 400, retained data from processing operations, training data, modeling data for execution of processing operations, and knowledge data among other examples. Furthermore, in examples, components of system 400 may utilize knowledge data (as previously described) in processing by components of system 400. Knowledge may be used by one or more components of system 400 to improve processing of any of the application components 406 where knowledge data can be obtained from resources internal or external to system 400. In examples, knowledge data may be maintained in storage(s) 414 or retrieved from one or more resources external to system 400 by knowledge fetch operation. As an example, application services that may be accessed for query data processing may be considered knowledge data that may be stored locally or accessed over a distributed network.

In FIG. 4, processing device 402 may be any device comprising at least one processor and at least one memory/storage. Examples of processing device 402 may include but are not limited to: processing devices such as desktop computers, servers, phones, tablets, phablets, slates, laptops, watches, and any other collection of electrical components such as devices having one or more processors or circuits. In one example processing device 402 may be a device of a user that is executing an application/service associated with query processing. In examples, processing device 402 may communicate with the application components 406 via a network 404. In one aspect, network 404 is a distributed computing network, such as the Internet. Application services may communicate with application components 406 via the network 404. Processing device 402 may be a device as described in the description of FIGS. 1-3. In some examples, processing device 402 may comprise multiple connected devices.

The application components 406 are a collection of components that are used to receive and process query data. Application components 406 may comprise the user interface component 408, the pre-web classification component 410, and the web ranking component 412. In alternative examples, one or more additional components may be created to manage operations described throughout the present disclosure. In different examples, the application components 406 may be used to execute independently from other application components 406. As an example, processing executed by the pre-web classification component 410 (or any other of the application components 406) may be performed by a processing device or incorporated into a product separately from processing performed by other components such as the user interface component 408 or the web ranking component 412. Application components 406 may be stored on one or more processing devices (e.g., client device) or access to one or more of the application components 406 may be distributed, for example through a distributed network.

The user interface component 408 is one or more components that are configured to enable interaction with a user of a processing device to enable receipt and processing of query data. Transparency and organization are brought to users of a processing device through the user interface component 408 where a user can interact with an application for query execution through user interface elements that are programmed to enable a processing device to interact with a user. As an example, the user interface component 408 may comprise generation and display of one or more user interface elements upon a display of a processing device. The user interface elements may be graphical icons used to represent information associated with an application, such as a search application that may process query data. The user interface component 408 may further execute as a front-end for display (e.g., graphical user interface) of back-end processing performed by the other application components 406. In examples, user interface definition files may be used to define user interface elements for fostering interaction between a processing device and a search application executing on a processing device. User interface definition files may comprise programming instructions or operations for management and display of user interface elements associated with user interface component 408.

The pre-web classification component 410 is a component of the system 400 that may execute query data processing before a web ranking service evaluates result data for the query data. The pre-web classification component 410 may be one or more executable programs, application programming interfaces (APIs), or any other collection of processing operations, functions, routines, protocols, and/or tools for building and executing software applications on one or more processing devices. In at least one example, the pre-web classification component 410 may be configured to receive, process and tag a received input (e.g., query data) for processing. In some examples, the pre-web classification component 410 may interface with the user interface component 408 to enable receipt of query data for processing. The pre-web classification component 410 may execute processing operations to process the query data before a web ranking is performed on results data for the query data. In examples, such processing operations may comprise one or more computer-executable instructions/programming operations, application programming interfaces (APIs), machine learning processing, and any other type of programming application or service. One skilled in the art should also recognize that data is collected and evaluated in accordance with privacy laws for the protection of users and sensitive information.

The pre-web classification component 410 may execute processing that compares query data (e.g. entire query data and/or portions of the query data) with a vertical intent classification index. Such processing emits flexible and fast classification and entity identification in small enough time as to minimize latency in query processing before searching of the main web indexes for ranking and returning web results data. Evaluation of query data using processing that searches the vertical intent classification index may identify candidate entity identifiers for the query data. A candidate entity identifier is system data that identifies an entity so a search service can retrieve results data for the entity. The vertical intent classification index creates an optimized indexing system geared towards short text documents. As an example, the vertical intent classification index may take short text documents (e.g., lyrics and body of lyrics) and break it up into fragments of text so query data can be matched in different ways (words, phrases, strings, characters, and can account for misspellings, partial words, etc.). In one processing example, the vertical intent classification index may evaluate the query data using a default filter setting (e.g., AND processing) that can search the vertical intent classification index using the query data based on a combination words of together (and in a given order) to evaluate candidate entity identifiers. In other processing examples, the vertical intent classification index may apply a relaxed filter setting (e.g., relaxed AND processing) to query data to support disjunctions, phrases, word-prefixes, missing words, misspellings etc. One skilled in the art should recognize that other filter settings known in the art may be applied. In one example, a vertical intent classification index may comprise a plurality of vertical intents where the index is organized by grouping of any number of vertical intents (e.g., song titles, book titles, paper titles, etc.). In an alternative example, a vertical intent classification index may be created for each of a plurality of vertical intent classifications. In such an example, processing operations may be applied to simultaneously search a plurality of vertical intent classification indexes in an efficient manner.

Further, as identified above, a vertical intent classification index may index partial words. This allows the vertical intent classification index to not only be more accurate but also enable auto suggestions to be determined and passed to a web ranking service as well as provide processing to rewrite query data. For example, if a query data is determined to be incomplete or incorrect, modification to query data may be passed to the web ranking service. In one example, suggestions for interpreting the query data may be provided where processing may yield a candidate entity identifier may be a song title of "love me do" for query data of "love do."

As identified above, the vertical intent classification index comprises a set of files to quickly and efficiently determine one or more candidate entity identifiers for the query data and transmit data to a web ranking service to improve query data processing. The vertical intent classification index may comprise a plurality of forward index files, a vocabulary file, an inverted index file and a document table file. In examples, the pre-web classification component 410 may generate one or more of the forward index files, the vocabulary file, the inverted index file and the document table file. Processing applied by the pre-web classification component 410 may utilized each of the set of files to improve query data processing. For example, use of each of the set of files saves time, resources and processing bandwidth, to efficiently identify a small number on candidate entity identifiers (and vertical intent classification for the candidate entity identifications) to transmit to the web ranking component 412 for further processing. If just one of a forward index file or inverted index were used, there may be a huge delay in time (e.g., greater latency) to obtain candidate entity identifiers. In that scenario, a listing of candidate entity identifiers might be lengthy or inaccurate, which can result in higher latency in returning web results data based on processing by a web ranking service.

The set of files may comprise a plurality of forward index files. The plurality of forward index files may be stored in any data format. A forward index file comprises data for a document or file that is searchable using the vertical intent classification index. As an example, a forward index file may be an index file created for a short text document. A forward index file may comprise data of a document in an organized manner, for example, broken down by title, body, lines, words, etc. A forward index files provides data from which the vocabulary file, inverted index file and document table file may be generated. In one example, the pre-web classification component 410 receives a forward index file from another component, where the component may be external to the components of system 400. Further, a forward index file enables for the vertical intent classification index to execute a detailed comparison of the text of the query data with that of documents for candidate entities. Moreover, a forward index file may comprise additional data relates to enables a system to it contains a reference to the full details of what has been matched during processing. For example, the forward index file may comprise identification of an entity associated with the document from which the forward file is generated as well as other data such as bibliographic data for the document as an example. The forward index file may further comprise any other data that may be useful to identify a document of the forward index file and/or entities associated with the forward index file.

The set of files may comprise a vocabulary file that is generated from the plurality of forward index files. A vocabulary file may be stored in any data format. The generated vocabulary file may be a sorted list of the words identified from the plurality of forward index files. Words in the vocabulary file may be arranged in any manner to foster efficient analysis of the vocabulary file. As an example, processing may be performed that scans the plurality of forward index files and processes data fields of the forward index files into an organized listing of words and records that is the vocabulary file. For a word that is encountered in a forward index file, processing performed may store a document number associated with the forward index file and a word position within the document. More specifically, an exemplary vocabulary file may comprise: identification of a word found in a forward index file; a count of the total number of times the word appears across all short text documents; a reference to a position in an inverted index file that can be used for document identification.

The set of files may comprise an inverted index file. An inverted index file may be stored in any data format. In examples, one or more inverted index files may be generated. An inverted index file may be a compressed, memory-resident, static-ordered file that is oriented for short texts.

The inverted index file enables lookup of a posting that provides identification of a document that a word (in the vocabulary file) appears and a position in the document that the word appears. The reference in the vocabulary file enables quick lookup of a posting within the inverted index file. A posting in the inverted index file may be used to access a document table file.

The document table file is one or more files used to provide information for a document from which a forward index file is generated. A document table file may be stored in any data format. The document table file may comprise entries associated with a plurality of documents such as short text documents. Data maintained by the document table file may comprise but is not limited to: data for how many words are found in document, reference to forward index files corresponding with the document, offset data for document lookup, statistical data regarding access to the document include a static score associated with a popularity of the document, and bloom filter data, among other examples. Any of such data may be used by the pre-web classification component 410 to evaluate and rank candidate entity identifiers. References to forward index files may be used to access the forward file for a comparison of text of a candidate entity identifier with the text of the query data.

When query data is received, the query data may be processed by the pre-web classification component 410 that analyzes the query data using the vertical intent classification index. Developers may program processing rules for identifying and evaluating candidate entities that may be associated with query data. As an example, processing performed may use the query data to search the vocabulary file to identify a posting in the inverted index file for one or more words of the query data. Consider an example where a query of "accounting for change" is received that may be referencing an academic paper having the query data as the title of the paper. The vocabulary file may be searched to identify each word of the query data and look up posting information for each of those words. Searching of the vocabulary file provides access to the list of postings for each of 'accounting', 'for', and 'change'. Processing may be performed that scans the listing returns results and further analyzes the posting data to identify candidates where the words accounting for change may appear in a same document. This can create an initial list of candidate entities to consider for results data that may match the query data. Say, for example, there was a posting (100,1) for 'accounting', (100,2) for 'for', and (100,3) for 'change'. The match of the document numbers provides indication that the three words of the query occur in document number 100. The word positions form a sequence indicating an exact phrase match. This may be an indication of a candidate entity to consider.

Further processing may be performed to prune the hits for candidate entities identified. One skilled in the art should recognize that rules can be set or programmed to apply processing using any data provided within the vertical intent classification index as well as other application services or knowledge data. For a candidate, the inverted index file may be used to access a record in the document table to further evaluate a candidate. For example, the document table may be used to lookup data associated with the document such as how many words are contained in the document. Continuing the above example, processing applied may evaluate processing evaluates the 100-th record in the document table. As an example, it may be identified that the 100-th document contains 10 words. Evaluation may determine that a candidate with 10 words may not be considered a close enough match for a 3 word query of "accounting for change." In that case, the candidate may be rejected and processing resumes evaluating other candidate entities. Say the next candidate identified is document number 198 and that has 4 words. Processing may determine that this may be a candidate to further evaluate for query data of "accounting for change."

The document table record has a reference to the forward index file which where processing may be performed to compare the text of the candidate with the text of the query. The forward index file for the document (e.g., document number 198) may be evaluated to match the query data with the text of the document. Matches may be evaluated based on lexical similarity and/or other features and compared against predefined thresholds before a set of vertical intents are recommended and for each of the recommended vertical intents, candidate entity identifiers that are to be considered. In one example, processing operations may be applied to evaluate the lexical similarity between the text of the query data and a text of a document. Candidate entity identifiers may be scored (and ranked) based on a lexical similarity match between the query data and the text of the document. In one example, lexical similarity is determined based on processing that evaluates a word count score. Lexical similarity processing operations that may be applied are known to one skilled in the art. High precision ranking of candidate entity identifiers may be yielded by gearing the vertical intent classification index towards short texts results in quick (typically sub-millisecond) response times with very high throughput while preferring sub-query phrase matches.

In another example, a scoring or ranking of the candidate entity identifiers may take into account not a lexical similarity score but also other features, for example, a static score related to the document. An exemplary static score may be determined based on any metric evaluating one or more aspects of a document. For instance, a popularity score may be associated with a document (e.g., based access to the document, user feedback for the document, or any other metric to evaluate the document). In one example, a scoring/ranking processing may assign weights to different features (e.g., lexical similarity, static score, scoring, other data from the vertical intent classification index, etc.) and rank the candidate entity identifiers based on application of the scoring/ranking processing.

The pre-web classification component 410 may execute processing that performs policy evaluation of ranked candidate entity identifiers. For example, processing may be performed that evaluates ranked candidate entity identifiers (e.g., a score that indicates a potential match as a result for the query data) and outputs one or more ranked candidate entity identifiers to the web ranking component 412. In one example, a threshold analysis may be executed that outputs one or more ranked candidate entity identifiers. However, one skilled in the art should recognize that policy evaluation for output of ranked candidate entity identifiers may vary while considering such factors as processing bandwidth, execution time/latency, etc. The pre-web classification component 410 may transmit the one or more ranked candidate entity identifiers to the web ranking component 412. In addition to transmitting the ranked candidate entity identifiers, the pre-web classification component 410 may further propagate an indication of a vertical intent classification for each of the ranked candidate entity identifiers. For example, consider a ranked candidate entity identifying an academic paper "accounting for change." The pre-web classification component 410 may propagate the query data, identification of the candidate entity (e.g., a reference to the knowledge base entry containing all the information known about the "accounting for change" academic paper), identification of the vertical intent (e.g., academic paper) for the candidate entity, a score or ranking associated with how well the identified candidate entity matches the query data. In other examples, additional data identified from processing by the vertical intent classification index may be transmitted depending on available bandwidth and latency in the pre-web classification processing.

Furthermore, the pre-web classification component 410 may modify data stored associated with a vertical intent classification index to optimize the vertical intent classification index. As one example, vocabulary may be changed or updated to enable more efficient and more complete searching when the vertical intent classification index is used to match query data.

The web ranking component 412 is a component configured to process data received from the pre-web classification component 412 including the query data. The web ranking component 412 may be one or more executable programs, application programming interfaces (APIs), or any other collection of processing operations, functions, routines, protocols, and/or tools for building and executing software applications on one or more processing devices. As an example, the web ranking component 412 may execute a web ranking service to rank web results data. Web results data is any content that is accessible over a network connection such as the Internet. An exemplary web ranking service executes operations to process data input from the pre-web classification component 410, ranks web results data, and outputs the ranked web results data.

In one example, the web ranking service may retrieve and rank documents associated with the candidate entity identifiers propagated by the pre-web classification component 410. For instance, the web ranking service may use the candidate entity identifiers, among other data transmitted by the pre-web classification component 410, to retrieve content (e.g., documents, links, files, etc.) that can be displayed in a listing of ranked web results data. As an example, the web ranking component 412 may execute processing operations to evaluate the ranked candidate entity identifiers provided by the pre-web classification component 410. Web results data can be retrieved based on different candidate entity identifiers. The web ranking component 412 may utilize a ranked candidate entity identifier and vertical intent classification, among other data provided by the pre-web classification component 410, to determine different types of content to display as web results data. For instance, web results data generated for an academic paper "accounting for change" (described in previous examples) may include not only a link to the academic paper but also other types of content such as data about the author of the academic paper, relate documents/websites, images, audio/commentary files related to the academic paper, etc. In such a way, the data provided by the pre-web classification component may enable the web ranking component 412 to provide richer web results data for a query. In some examples, the web ranking component 412 may utilize the scoring provided by the pre-web classification component 410 as ranked web results data. In other examples, the web ranking component 412 may generate web results data that takes into account the ranked candidate entity identifiers. For instance, the web ranking component 412 may re-score/re-rank data transmitted from the pre-web classification component 410 to generate web results data.

In examples, the web ranking component 412 may output ranked web results data in response to processing received query data. In some examples, outputting of the ranked web results data may comprise transmitting the ranked web result data to a processing device configured to display the ranked web results data. An example processing device may be processing device 402 or any device that initiated query processing such as a client device. In other examples, the web ranking component 412 may be included within an application/service executing locally on a processing device, where outputting of web results data may comprise displaying the web results data on a processing device (or a display connected with the processing device).

Figure 5:
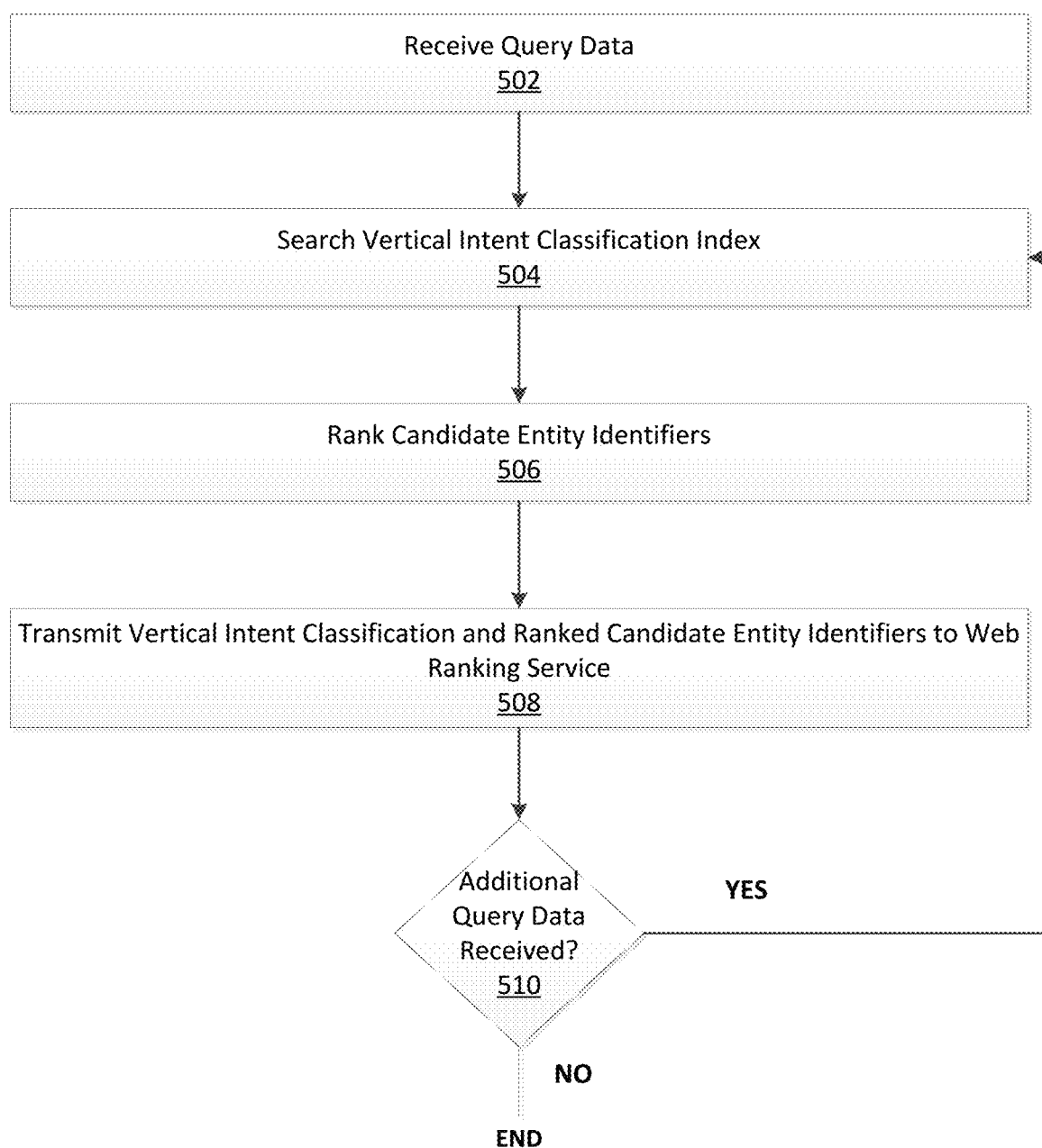
FIG. 5 is an exemplary method for pre-web classification of query data with which aspects of the present disclosure may be practiced.

FIG. 5 is an exemplary method 500 for pre-web classification of query data with which aspects of the present disclosure may be practiced. As an example, method 500 may be executed by an exemplary processing device and/or system such as those shown in FIGS. 1-4. In one example, system 400 of FIG. 4 describes examples of components that may be used for implementation of method 500. In examples, method 500 may execute on a device comprising at least one processor configured to store and execute operations, programs or instructions. However, method 500 is not limited to such examples. In at least one example, method 500 may be executed (e.g., computer-implemented operations) by one or more components of a distributed network, for instance, web service/distributed network service (e.g., cloud service). In examples, operations performed in method 500 may correspond to operations executed by a system and/or service that execute computer programs, application programming interfaces (APIs), or machine-learning processing, among other examples.

Method 500 begins at operation 502 where query data is received. Receiving of query data is described in the description of FIG. 4. As an example, query data may be received (operation 502) and processed utilizing one or more components such as user interface component 408 and pre-web classification component 410.

Flow may proceed to operation 504, where a vertical intent classification index may be searched using the query data. An exemplary vertical intent classification index is described in at least the description of FIG. 4. In examples, the vertical intent classification index may comprise a set of files that can be used to determine one or more candidate entity identifiers for the query data. Searching (operation 504) may identify one or more potential candidate entity identifiers associated with the query data. As an example, a candidate entity identifier may be an identifier for a short text document. Entity candidate identifications may be further evaluated and a list of candidate entity identifications associated with one or more vertical intents may be pruned to identify N number of best candidate entity identifiers to propagate to a web ranking service. Examples of pruning candidate entity identifications is described above with reference to the pre-web classification component described in FIG. 4, for example. In at least one example, the vertical intent classification index may be an index for a grouping of short text documents. The set of files for the vertical intent classification index comprises a plurality of forward index files, a vocabulary file, an inverted index file and a document table file. The vocabulary file may be generated by a processing that fragments portions of the plurality of forward index files, each associated with a short text document, to generate an ordered listing of words from the short text documents. The searching (operation 504) of the vertical classification index may further comprise searching the vocabulary file to identify a posting in the inverted index file for one or more words of the query data, and identifying the one or more candidate entity identifications based on evaluating a position of the one or more words in a document associated with a candidate entity identifier. Evaluating of the position of the one or more words may further comprise using a posting, in the inverted index file, to access the document table file. An exemplary posting may comprise data indicating a document that a word or portion of a word (from the query data) appears and a position in the document that the word appears. The document table file comprises data about a document corresponding with the candidate entity identifier and a reference to a forward index file for the document. The reference to the forward index file provides quick access to the at least one forward file for text matching of the query data to a candidate entity identifier.

Flow may proceed to operation 506 where identified candidate entity identifiers may be further propagated and ranked to further evaluate the candidate entity identifiers for output. In one example, one or more ranked candidate entity identifiers may be transmitted to a web ranking service. Operation 506 may comprise evaluating, for the one or more candidate entity identifiers, a lexical similarity between the query data and text of a document for a candidate entity identifier. Ranking (operation 506) may apply and execute processing operations to automatically generate a listing of ranked entity identifiers. In other example, a ranking of for each of the candidate entity identifiers may comprise evaluating additional features (e.g., statistic score, other data from a vertical intent classification index) in addition to a lexical similarity of a document and the query data. Examples for ranking/scoring candidate entity identifiers are described in at least the description of the pre-web classification component 410 described in FIG. 4. In examples, the ranking (operation 506) may further comprise generating a score for a candidate entity identifier based on the evaluating. In at least one example, a policy may be applied to evaluate ranked candidate entity identifiers using a threshold analysis to determine one or more ranked candidate entity identifiers to propagate to a web ranking service. The threshold analysis may evaluate a ranked score of a candidate entity identifier based on processing using the vertical intent classification index and output ranked candidate entity identifiers that meet or exceed the threshold requirement. One skilled in the art should recognize that a threshold requirement can be set by developers and may vary in different processing environments. In another example, a policy determination may be applied to evaluate any number (N best) of highest ranked candidate entity identifiers.

Flow may proceed to operation 508, where the query data, a vertical intent classification for the vertical intent classification index and the one or more ranked candidate entity identifiers from the vertical intent classification index may be transmitted for processing. As an example, such data may be transmitted (operation 508) to a web ranking service by a component such as the pre-web classification component 410 described in FIG. 4. In examples, the vertical intent classification, among other associated data processed by application of the vertical intent classification index, may be transmitted before the web service evaluates the query data to return web ranking results. In one example, transmitting (operation 508) further comprises providing, to the web ranking service, auto-complete suggestions based on processing of the query data using the vertical intent classification index.

Flow may then proceed to decision operation 510, where it is determined whether additional query data is received. In some examples, processing may determine that the initial query data is not able to be clearly understood and processed. In such an example, a response may be returned requesting clarification of query data. In other examples, operation 510 may comprise receiving a subsequent query for processing. If it is determined that no additional query data is received, flow branches NO and processing ends or remains idle until query data is received. If it is determined that additional query data is received, flow branches YES and returns to processing operation 504.

FIG. 6 is an exemplary method 600 for processing of query data by a web ranking service with which aspects of the present disclosure may be practiced. As an example, method 600 may be executed by an exemplary processing device and/or system such as those shown in FIGS. 1-4. In one example, system 400 of FIG. 4 describes examples of components that may be used for implementation of method 600. In examples, method 600 may execute on a device comprising at least one processor configured to store and execute operations, programs or instructions. However, method 600 is not limited to such examples. In at least one example, method 600 may be executed (e.g., computer-implemented operations) by one or more components of a distributed network, for instance, web service/distributed network service (e.g., cloud service). In examples, operations performed in method 600 may correspond to operations executed by a system and/or service that execute computer programs, application programming interfaces (APIs), or machine-learning processing, among other examples.

Method 600 begins at operation 602 where data associated with pre-processing of the query data is received at a web ranking service. As an example, a web ranking service may be executed by a web ranking component such as the web ranking component 412 described in FIG. 4. In examples, operation 602 may comprise receiving at least the query data, a vertical intent classification and one or more ranked candidate entity identifiers. In other examples, additional data may be received from processing using a vertical intent classification index that may be useful for a web ranking service to provide ranked web results data.

Flow may proceed to operation 604, where the query data is processed by the web ranking service. Processing (604) of the query data may comprise evaluating data received from pre-web processing. Operation 604, performed by an exemplary web ranking service, may generate a ranked list of web results data. Processing time/bandwidth (operation 604) may be reduced due to data received from pre-web processing, thereby enabling a web ranking service to quickly identify a best set of web results data to return while reducing latency time in processing the web results data. Furthermore, the processing (operation 604) may use vertical intent classification and the ranked candidate entity identifiers to provide richer web results data as compared to web ranking occurring without data from pre-web processing.

Flow may proceed to operation 606, where ranked web results data is output. In one example, operation 606 comprises transmitting the ranked web results data to a processing device configured to display the ranked web results data. In an alternative example of method 600, the web ranking service may display (operation 608) the ranked web results data on a processing device executing the web ranking service.

Non-limiting examples of the present disclosure describe low latency pre-web classification of query data. In examples, processing is performed where query data can be analyzed in a low latency manner that includes providing a vertical intent classification and entity identification for query data before a web ranking service processes the query data. Query data may be received. A vertical intent classification index may be searched using the query data. In examples, the vertical intent classification index may comprise a set of files that can be used to determine one or more candidate entity identifiers for the query data. The one or more entity identifiers may be ranked. A vertical intent classification for the vertical intent classification index and the one or more ranked candidate entity identifiers may be transmitted for processing associated with a web ranking service. In examples, the vertical intent classification is transmitted before the web ranking service evaluates the query data to return web ranking results. As an example, a vertical intent classification for the vertical intent classification index and the one or more ranked candidate entity identifiers may be transmitted to one or more processing devices associated with the web ranking service. In examples, the vertical intent classification index is an index for short text documents. The set of files for the vertical intent classification index comprises a plurality of forward index files, a vocabulary file, an inverted index file and a document table file. The vocabulary file may be generated by a processing that fragments portions of the plurality of forward files, each associated with a short text document, to generate an ordered listing of words from the short text documents. The searching of the vertical classification index may further comprise searching the vocabulary file to identify a posting in the inverted index file for one or more words of the query data, and identifying the one or more candidate entity identifiers based on evaluating a position of the one or more words in a document associated with a candidate entity identifier. Evaluating of the position of the one or more words may further comprise using the posting, in the inverted index file, to access the document table file. The document table file comprises data about a document corresponding with the candidate entity identifier and a reference to a forward index file for the document. The reference to the forward index file provides quick access to the at least one forward index file for text matching of the query data to a candidate entity identifier. The ranking may further comprise evaluating, for the one or more candidate entity identifiers, a lexical similarity between the query data and text of a document for a candidate entity identifier, and generating a score for a candidate entity identifier based on the evaluation. In examples, the ranking further comprises determining the one or more candidate entity identifications to propagate to the web ranking service based on a threshold analysis that evaluates a score for the one or more candidate entity identifiers, and propagating the one or more ranked entity identifiers that satisfy the threshold analysis. The transmitting may further comprise providing, to the web ranking service, auto-complete suggestions based on processing of the query data using the vertical intent classification index. In other examples, processing may occur where query data is rewritten based on processing using the vertical intent classification index.

In other non-limiting examples a system may comprise one or more components for pre-web processing of query data and/or one or more components for a web ranking service that executes operations for processing query data to return results data over a network. In one example, a system may comprise a pre-web classification component that may be configured to receive and process query data. The pre-web classification component uses the query data to search a vertical intent classification index of short text documents. The vertical intent classification index comprises a set of files to determine one or more candidate entity identifiers for the query data. Searching of the vertical intent classification index may determine one or more candidate entity identifiers for the query data. The one or more candidate entity identifiers may be ranked. The pre-web classification component may transmit a vertical intent classification for the vertical intent classification index and the one or more ranked candidate entity identifiers to a web ranking component. The system may further comprise a web ranking component. The web ranking component may be configured to process the query data (and additional data transmitted from the pre-web classification component) to return web results data. As an example web ranking component receives the query data, the vertical intent classification and the one or more ranked candidate entity identifiers, for example, from the pre-web classification component. The web ranking component may further rank and output ranked web results data based processing of the query data, the vertical intent classification and the one or more ranked candidate entity identifiers. In at least one example, the web ranking component outputs the ranked web results data to a processing device configured to display the ranked web results data.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   receiving, during a user session, query data;
   using, during the user session, the query data to evaluate a vertical intent classification index, wherein the evaluation comprises determining a vertical intent classification and one or more candidate entity identifiers for the query data, and wherein the vertical intent classification index comprises a plurality of index files;
   ranking the one or more candidate entity identifiers; and
   transmitting the query data, a vertical intent classification for the vertical intent classification index and the one or more ranked candidate entity identifiers to a processing device associated with a web ranking service.

2. The method according to claim 1, wherein the vertical intent classification index is an index for short text documents, and wherein the set of files for the vertical intent classification index comprises a plurality of forward index files, a vocabulary file, an inverted index file and a document table file.

3. The method according to claim 2, wherein the vocabulary file is generated by a processing that fragments portions of the plurality of forward index files, each associated with a short text document, to generate an ordered listing of words from the short text documents.

4. The method according to claim 3, wherein the searching further comprises searching the vocabulary file to identify a posting in the inverted index file for one or more words of the query data; and identifying the one or more candidate entity identifiers based on evaluating a position of the one or more words in a document associated with a candidate entity identifier.

5. The method according to claim 4, wherein the evaluating of the position of the one or more words further comprises using the posting, in the inverted index file, to access the document table file, wherein the document table file comprises data about a document corresponding with the candidate entity identifier and a reference to a forward index file for the document, and wherein the reference provides quick access to the at least one forward index file for text matching of the query data to a candidate entity identifier.

6. The method according to claim 5, wherein the ranking further comprises evaluating, for the one or more candidate entity identifiers, a lexical similarity between the query data and text of a document for a candidate entity identifier; and generating a score for a candidate entity identifier based on the evaluation.

7. The method according to claim 6, wherein the ranking further comprises determining the one or more candidate entity identifiers to propagate to the web ranking service based on a threshold analysis that evaluates a score for the one or more candidate entity identifiers; and propagating the one or more ranked entity identifiers that satisfy the threshold analysis.

8. The method according to claim 1, wherein the vertical intent classification is transmitted before the web ranking service evaluates the query data to return web ranking results.

9. The method according to claim 1, wherein the transmitting further comprises providing, to the web ranking service, auto-complete suggestions based on processing of the query data using the vertical intent classification index.

10. A system comprising:
at least one processor; and
a memory operatively connected with the at least one processor storing computer-executable instructions that, when executed by the at least one processor, causes the at least one processor to execute a method that comprises:
receiving, during a user session, query data;
using, during the user session, the query data to evaluate a vertical intent classification index, wherein the evaluation comprises determining a vertical intent classification and one or more candidate entity identifiers for the query data, and wherein the vertical intent classification index comprises a plurality of index files;
ranking the one or more candidate entity identifiers; and
transmitting the query data, a vertical intent classification for the vertical intent classification index and the one or more ranked candidate entity identifiers to a web ranking service.

11. The system according to claim 10, wherein the vertical intent classification index is an index for short text documents, and wherein the set of files for the vertical intent classification index comprises a plurality of forward index files, a vocabulary file, an inverted index file and a document table file.

12. The system according to claim 11, wherein the vocabulary file is generated by a processing that fragments portions of the plurality of forward index files, each associated with a short text document, to generate an ordered listing of words from the short text documents.

13. The system according to claim 12, wherein the searching further comprises searching the vocabulary file to identify a posting in the inverted index file for one or more words of the query data, and identifying the one or more candidate entity identifiers based on evaluating a position of the one or more words in a document associated with a candidate entity identifier.

14. The system according to claim 13, wherein the evaluating of the position of the one or more words further comprises using the posting, in the inverted index file, to access the document table file, wherein the document table file comprises data about a document corresponding with the candidate entity identifier and a reference to a forward index file for the document, and wherein the reference provides quick access to the at least one forward index file for text matching of the query data to a candidate entity identifier.

15. The system according to claim 14, wherein the ranking further comprises evaluating, for the one or more candidate entity identifiers, a lexical similarity between the query data and text of a document for a candidate entity identifier, and generating a score for a candidate entity identifier based on the evaluation.

16. The system according to claim 15, wherein the ranking further comprises determining the one or more candidate entity identifiers to propagate to the web ranking service based on a threshold analysis that evaluates a score for the one or more candidate entity identifiers, and propagating the one or more ranked entity identifiers that satisfy the threshold analysis.

17. The system according to claim 10, wherein the vertical intent classification is transmitted before the web ranking service evaluates the query data to return web ranking results.

18. The system according to claim 10, wherein the transmitting further comprises providing, to the web ranking service, auto-complete suggestions based on processing of the query data using the vertical intent classification index.

19. A computer-readable storage media not consisting of a propagated data signal, the computer-readable media storing computer executable instructions that when executed cause a computing system to perform a method providing sequential two-handed touch typing, the method comprising:
receiving, during a user session, query data;
using, during the user session, the query data to evaluate a vertical intent classification index of short text documents, wherein the evaluation comprises determining a vertical intent classification and one or more candidate entity identifiers for the query data, and wherein the vertical intent classification index comprises a plurality of index files;
ranking the one or more candidate entity identifiers; and
transmitting the query data, a vertical intent classification for the vertical intent classification index and the one or more ranked candidate entity identifiers to a processing device associated with a web ranking service.

20. The computer-readable storage media according to claim 19, wherein the web ranking component outputs the ranked web results data to a processing device configured to display the ranked web results data.

* * * * *